United States Patent [19]

Masauji et al.

[11] Patent Number: 4,909,043
[45] Date of Patent: Mar. 20, 1990

[54] AIR CONDITIONING CONTROL SYSTEM FOR AUTOMOTIVE VEHICLES

[75] Inventors: Mamoru Masauji; Kazuo Fujii, both of Saitama, Japan

[73] Assignee: Diesel Kiki Co., Ltd., Tokyo, Japan

[21] Appl. No.: 258,154

[22] Filed: Oct. 14, 1988

[30] Foreign Application Priority Data

Oct. 26, 1987 [JP] Japan .................................. 62-270962

[51] Int. Cl.$^4$ .............................................. F25B 1/00
[52] U.S. Cl. ...................................... 62/158; 62/227; 62/228.5
[58] Field of Search ...................... 62/227, 209, 229.5, 62/229.4, 158

[56] References Cited

U.S. PATENT DOCUMENTS 4,622,827 11/1986 Jabami et al. ......................... 62/158
4,667,480 5/1987 Bessler .................................. 62/323.3

FOREIGN PATENT DOCUMENTS 58-43340 3/1983 Japan .
0071840 4/1985 Japan .................................. 62/228.4

*Primary Examiner*—William E. Wayner
*Attorney, Agent, or Firm*—Frishauf, Holtz, Goodman, Woodward

[57] ABSTRACT

An air conditioning control system for an automotive vehicle, comprises a compressor controllable in capacity in response to an external control signal, an evaporator connected to the compressor, a sensor for sensing a temperature of the evaporator, an arithmetic control section for calculating a value of the control signal based upon an output from the sensor, and an output section for supplying the control signal having a value calculated by the arithmetic control section to the compressor. The arithmetic control section carries out first mode control in which it calculates the value of the control signal so that the temperature of the evaporator is held at a predetermined value. The arithmetic control section carries out, in addition to the first mode control, second mode control in which, if a predetermined condition is satisfied, it calculates the value of the control signal so that the capacity of the compressor is brought to the maximum value, for a limited period of time after the compressor is started.

10 Claims, 8 Drawing Sheets

AIR CONDITIONING CONTROL SYSTEM FOR AUTOMOTIVE VEHICLES

BACKGROUND OF THE INVENTION

This invention relates to an air conditioning system for automotive vehicles, which is equipped with a variable capacity compressor controllable by an external control signal.

Conventional air conditioning control systems for automotive vehicles include a type which is equipped with a variable capacity compressor which has its capacity controlled by an electrical signal supplied from the outside of the compressor, in other words, in which at least the suction pressure is automatically controlled to a constant value in response to an external control signal.

One of conventional air conditioning control systems of this type is known e.g. from Japanese provisional patent publication (Kokai) No. 58-43340, according to which the capacity of the compressor is controlled in response to the cooling degree of the evaporator and the ambient temperature encompassing the automotive vehicle.

Air conditioning control systems of this type, of which the capacity of the compressor is appropriately varied in response to conditions under which the system is placed, such as thermal load, are advantageous in consumption of the energy, as compared with one equipped with a fixed capacity compressor. However, they have difficulties in carrying out cooling-down control. Specifically, as shown in FIG. 9 for example, according to a system of this type in which the compressor capacity is controlled in response to the temperature within the vehicle compartment, the compressor capacity decreases as the compartment temperature lowers, resulting in poor cooling-down ability. Further, according to conventional systems of this type, the cooling degree of the evaporator is detected, and control of the compressor capacity is carried out so that the temperature of the evaporator does not lower below the freezing point. Therefore, the compressor capacity cannot be set to such a large value that the evaporator temperature lowers below the freezing point, in order to prevent the evaporator from being frozen.

As a result, according to conventional air conditioning control systems of this type, when the cooling degree of the evaporator is detected to be close to the freezing point, the compressor capacity is controlled to a reduced value so as to prevent freeze-up of the evaporator. Therefore, the variable capacity compressor is virtually inferior in cooling-down ability to fixed capacity compressors which can be operated with full capacity until the freezing point is reached.

SUMMARY OF THE INVENTION

It is the object of the invention to provide an air conditioning control system for automotive vehicles, which is provided with a variable capacity compressor, and which is capable of carrying out cooling-down control with the compressor set to full capacity, irrespective of the cooling degree of the evaporator.

To attain the above object, the present invention provides an air conditioning control system for an automotive vehicle, which comprises a compressor controllable in capacity in response to an external control signal, an evaporator connected to the compressor, sensor means for sensing a temperature of the evaporator, arithmetic control means for calculating a value of the control signal based upon an output from the sensor means, and output means for supplying the control signal having a value calculated by the arithmetic control means to the compressor, the arithmetic control means carrying out first mode control in which it calculates the value of the control signal so that the temperature of the evaporator is held at a predetermined value.

The air conditioning control system according to the invention is characterized by an improvement wherein the arithmetic control means carries out, in addition to the first mode control, second mode control in which, if a predetermined condition is satisfied, it calculates the value of the control signal so that the capacity of the compressor is brought to the maximum value, for a limited period of time after the compressor is started.

The above and other objects, fatures, and advantages of the invention will be more apparent from the following detailed description taken in conjunction with the accompanying drawings.

DETAILED DESCRIPTION

An embodiment of the invention will now be described in detail with reference to the drawings.

Figure 1:
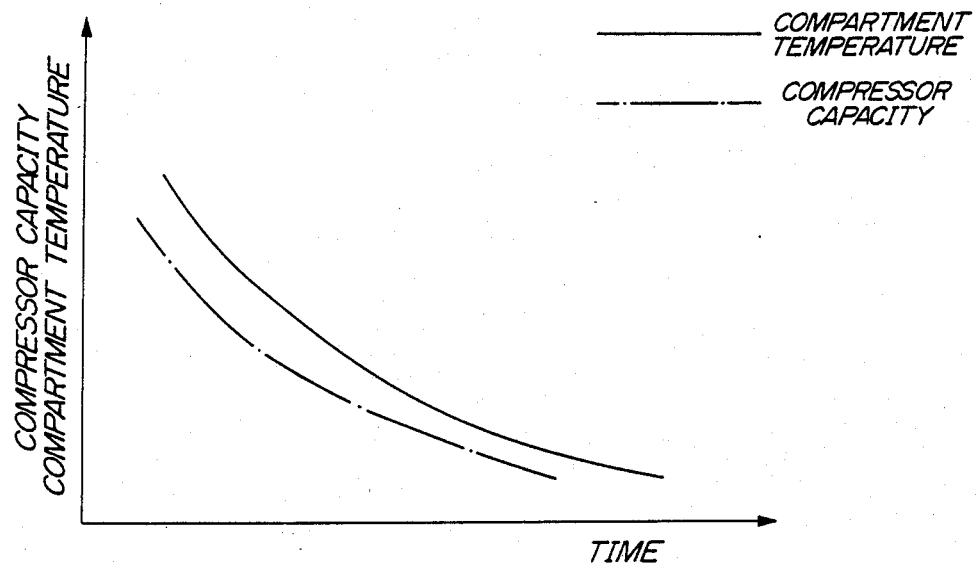
FIG. 1 is a graph showing changes in the compartment temperature and the compressor capacity plotted with respect to the lapse of time according to conventional compressor capacity control based upon the compartment temperature.
Figure 2:
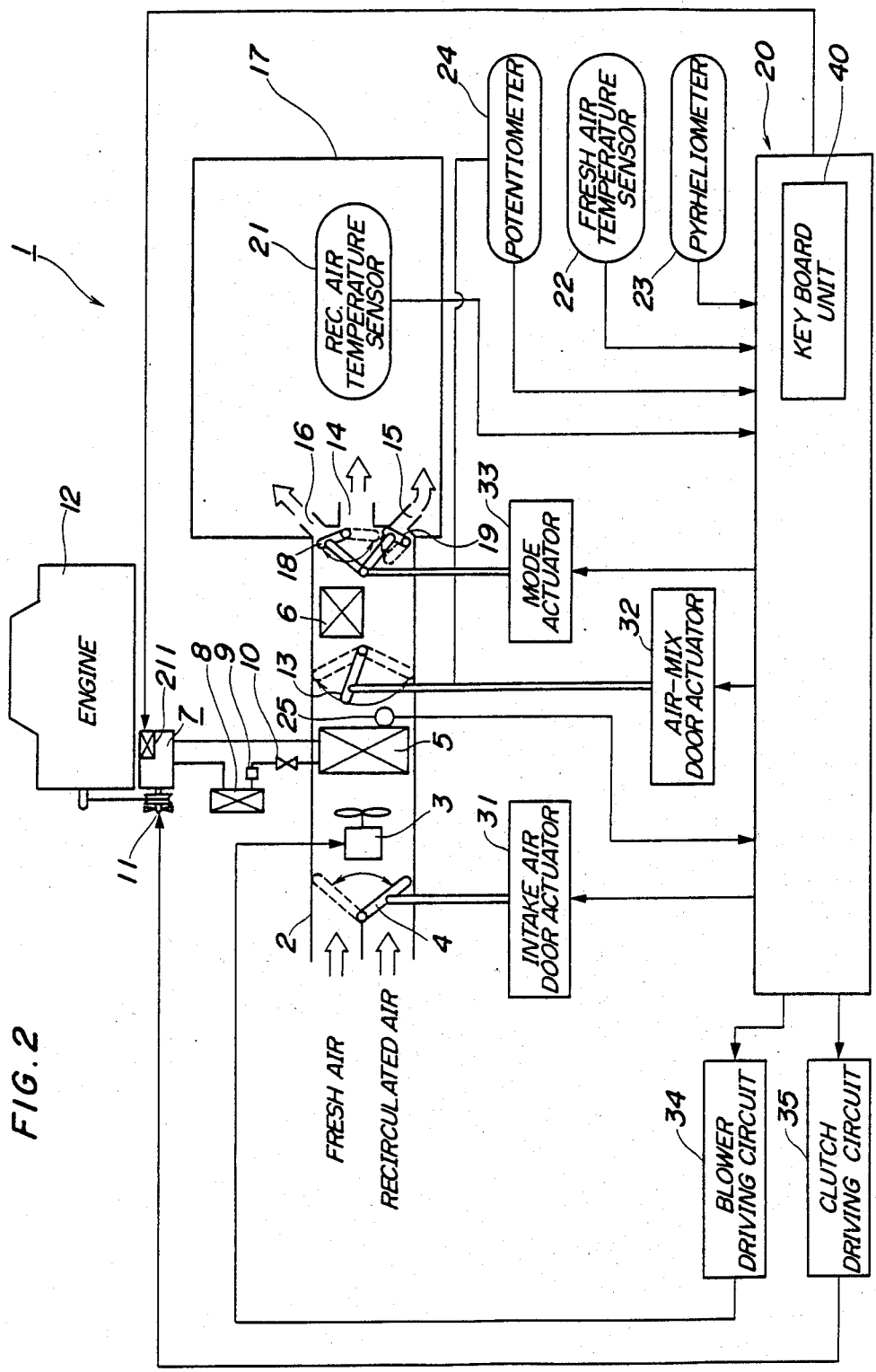
FIG. 2 is a schematic view showing an air conditioning control system for automotive vehicles, according to an embodiment of the invention.

Referring first to FIG. 2, there is schematically illustrated an air conditioning control system for an automotive vehicle, according to the invention.

As shown in the figure, arranged in an upstream end portion of an air duct 2 are a blower 3 for forcibly introducing air into the duct 2, and an intake door 4 for selecting fresh air introducing mode (FRESH mode) and recirculated air introducing mode (REC mode).

An evaporator 5 and a heater core 6 are arranged in the air duct 2 at a downstream side of the blower 3. The evaporator 5 forms a refrigerating circuit in cooperation with a variable capacity compressor 7, a condenser 8, a receiver tank 9, and a thermo-sensitive type automatic expansion valve 10.

FIG. 2 showws the internal structure of a variable capacity wobble-plate type compressor as an example of the compressor 7, which is controllable in capacity by an external control signal. The compressor 7 is adapted to carry out automatic internal control so that its suction perssure is held at a predetermined value. The predetermined value is controlled to vary by the external electrical signal to thereby vary the capacity of the compressor.

Figure 3:
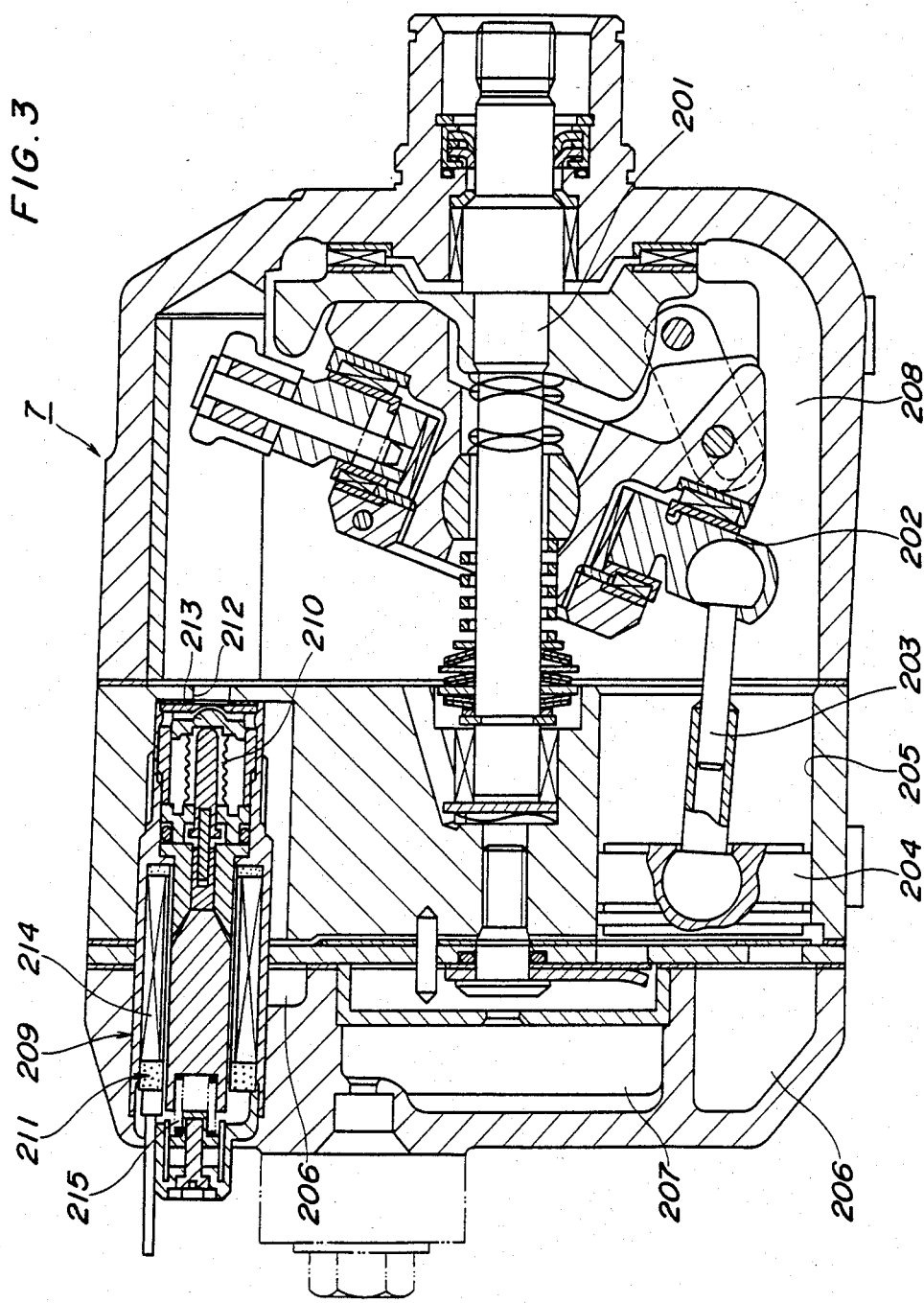
FIG. 3 is a longitudinal sectional view of a variable capacity wobble-plate type compressor employed in the system of FIG. 2.

As shown in FIG. 3, the compressor 7 has a drive shaft 201 connected to an engine 12 through an electromagnetic clutch 11 appearing in FIG. 2. When the clutch 11 is engaged, the rotation of the engine 12 is transmitted therethrough to the drive shaft 201 to rotatively drive the compressor 7. Mounted on the drive shaft 201 is a wobble plate 202 which is axially inclinable relative to the drive shaft 201. Pistons 204, only one of which is shown, are each connected to an outer peripheral portion of the wobble plate 202, via a coupling rod 203. The pistons 204 are received within respective cylinders 205 for reciprocating motion therein so that as the pistons 204 are reciprocated within the cylinders 205, refrigerant, which is introduced into a suction chamber 206, is drawn into the cylinders 205 and compressed therein, and the compressed refrigerant is discharged into a discharge chamber 207 and then into the condenser 8.

The angle of inclination of the wobble plate 202 is determined by the balance between the pressure within a crank chamber 208 and the reaction force of the pistons 204. More specifically, as the pressure within the crank chamber 209 increases when a communication passage 212, hereinafter referred to, is closed, the angle of inclination of the wobble plate 202 decreases to decrease the stroke of the pistons 204 so that the delivery quantity or capacity decreases, whereas as the pressure within the crank chamber 209 lowers when the communication passage 212 is opened, the angle of inclination increases to increase the piston stroke so that the capacity increases.

The pressure within the crank chamber 208 is controlled by means of a control valve 209. This valve 209 is composed of a bellows 210 upon which acts suction pressure from the suction chamber 206, an electromagnetic actuator 211, a valve body 213 disposed to selectively open and close the communication passage 212 which connects between the suction chamber 206 and the crank chamber 208, and a spring 215 urging the valve body 213 in its closing direction via the bellows 210. The valve body 213 is opened and closed in response to the balance between valve closing pressure which is the resultant force of a magnetically attractive force generated by current supplied to a solenoid 214 of the actuator 211 and the urging force of the spring 215 and which acts upon the valve body 213 in its closing direction, and suction pressure which acts upon the valve body 213 in its opening direction via the bellows 210. To be specific, as the value of current supplied to the solenoid 214 increases, the valve closing pressure increases so that the pressure within the crank chamber 208 increases, resulting in a corresponding decrease in the capacity of the compressor. The value of current supplied to the solenoid 214 is controlled by a control unit 20, hereinafter referred to.

Referring again to FIG. 2, the heater core 6 forms part of a hot water circuit in which coolant for the engine 12 is circulated, and heats air passing therethrough.

An air-mix door 13 is arranged in the air duct 2 at a location intermediate between the evaporator 5 and the heater core 6 and pivotable to change its anglular position to adjust the mixing ratio between hot water passing through the heater core 6 and cold air bypassing the heter core 6.

A portion of the air duct 2 downstream of the heater core 6 is formed with a face air outlet 14, a foot air outlet 15, and a defroster air outlet 16, which open in respective locations within a compartment 17 of the vehicle, and are provided with mode change doors 18 and 19 for selecting the air outlet through which air is to be discharged.

Figure 4:
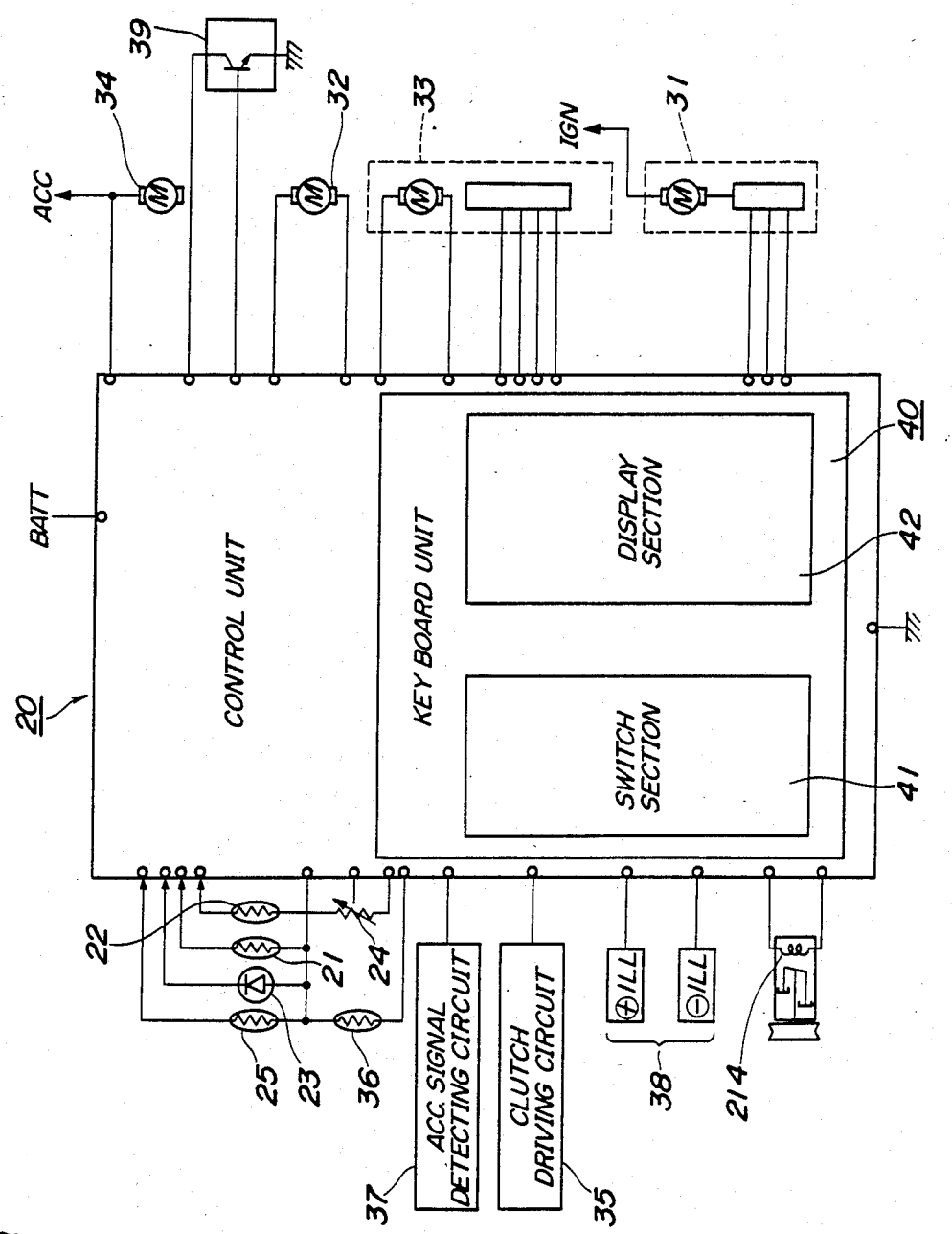
FIG. 4 is a schematic view showing a control unit in FIG. 1 and various elements connected thereto.

As shown in FIGS. 2 and 4, the control unit 20 which forms part of a microcomputer, has input terminals to which are connected a recirculated air temperature sensor 21, a fresh air temperature sensor 22, a pyrheliometer 23 formed by a photo diode or the like, a potentiometer 24 for detecting the angular position of the air-mix door 12, and an evaporator temperature sensor 25 mounted on a downstream end face or outlet of the evaporator 5 for sensing the temperature thereof (evaporator outlet temperature), for supplying respective output signals to the control unit 20 through A/D converters, not shown.

On the other hand, the control unit 20 has output terminals to which are connected an intake door actuator 31 for actuating the intake door 4, an air-mix door actuator 32 for controlling the angular position of the air-mix door 13, a mode actuator 33 for actuating the mode change doors 18, 19 for selecting the air outlet to be opened, a blower driving circuit 34 for turning on and off the blower 3 and controlling the flow rate of air blown thereby, a clutch driving circuit 35 for turning on and off the electromagnetic clutch 11, and the solenoid 214 of the electromagnetic actuator 211. In FIG. 4, reference numeral 36 designates a water temperature sensor, 37 an acceleration signal detecting circuit for detecting an acceleration signal from the engine 12 in order to interrupt the operation of the compressor during acceleration of the engine, 38 an illumination circuit for illuminating the whole front surface of the front panel of a key board unit 40, hereinafter referred to, and 39 a power transistor for the blower driving circuit 34.

As shown in FIG. 4, the key board unit 40 is incorporated in the control unit 20, which comprises a switch section 41 containing various switches, and a display section for indicating various kinds of information. Alternatively, the key board unit 40 may be provided separately from the control unit 20.

Figure 5:
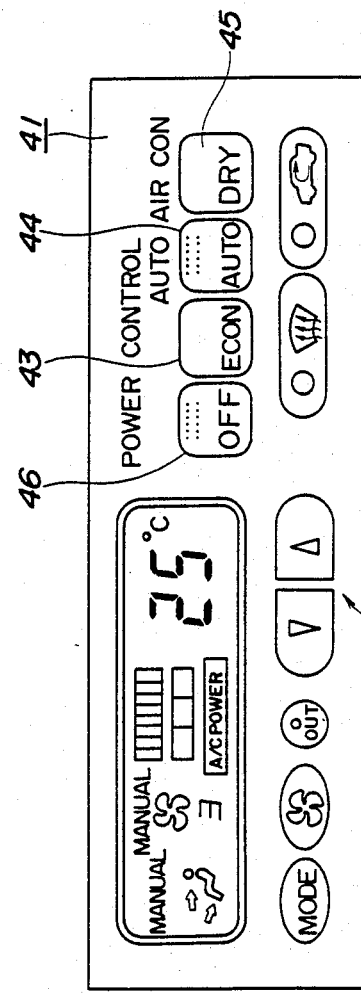
FIG. 5 is a front view showing a front panel of a key board unit in FIG. 2.
Figure 6:
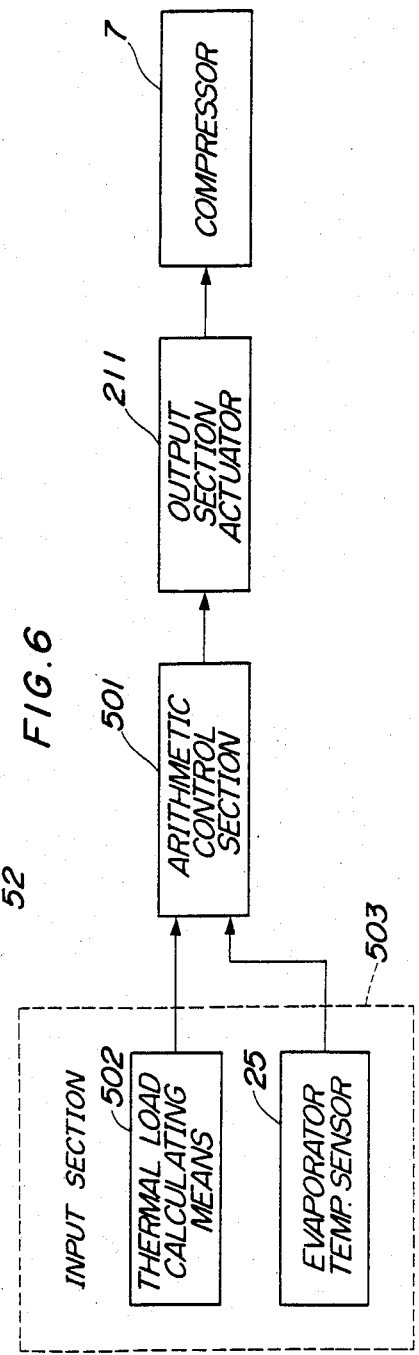
FIG. 6 is a block diagram showing an arrangement for carrying out compressor capacity control in cooling-down mode by means of a timer.

FIG. 5 shows the arrangement of the front panel of the key board unit 40. Arranged on the switch section 41 are an economy switch 43 for selecting economy control mode, an automatic switch 44 for selecting automatic control mode, a dry switch 45 for selecting dry or dehumidifying control mode, and an off switch for terminating automatic control mode, all of which belong to automatic control (A/C) mode.

Further arranged on the switch section 41 is a temperature setting switch 52 for setting desired compartment temperature, which forms part of thermal load calculating means in cooperation with the recirculated air temperature sensor 21 and the fresh air temperature sensor 22.

If the automatic control mode is selected, the compressor capacity is automatically controlled as follows:

Target temperature of air discharged into the compartment 17 is calculated from a synthetic signal indicative of thermal load on the air conditioning system (thermal load value calculated by the thermal load detecting means) obtained from the compartment temperature from the recirculated air temperature sensor 21, the fresh air temperature from the fresh air temperature sensor 22, the sunshine intensity from the pyrheliometer 23, and the set temperature set by the temperature setting switch 52. A target value of suction pressure for opening the valve body 213, i.e. a target value of evaporator outlet temperature is set, which can attain the calculated target discharge air temperature. The value of current supplied to the solenoid 214 is controlled in accordance with the set target value of evaporator outlet temperature, to control the capacity of the compressor. In addition to the compressor capacity control, the automatic control mode causes other kinds of air conditioning control to be automatically carried out, that is, control of the operation of the blower 3 including the flow rate control, control of the angular position of the air-mix door 13, air outlet-changing control of the mode change doors 18, 19, and mode changing control of the intake door 4.

The above automatic control mode is ordinary control conventionally carried out. According to the invention, the control unit 20 also carries out control in cooling-down mode, besides the ordinary control.

While as stated above, according to the ordinary control (automatic control mode), automatic control is effected wherein the compressor capacity is controlled so that the temperature of the evaporator sensed by the evaporator temperature sensor 25 is maintained at the set target value, according to the cooling-down control mode, the capacity of the compressor 7 is held at the maximum value over a limited period of time after the compressor has been turned on or or started.

In the present embodiment, to this end, a timer is provided in the arithmetic control section 501 of the control unit, which starts counting a predetermined period of time when the actual evaporator outlet temperature reaches a predetermined value (e.g. 0° C.). Connected to an input side of the arithmetic control section 501 is an input section having the thermal load calculating means 502 which at least includes the recirculated air temperature sensor 21, the fresh air temperature sensor 22, and the compartment temperature-setting switch 52, while the output section actuator 211 for the compressor 7 is connected to an output side of the arithmetic control section 501.

The arithmetic control section 501 is composed by a microcomputer forming the control unit 20, and calculates the target suction pressure from the target discharge air temperature, and supplies to the compressor 7 a control signal for controlling its capacity, based upon the results of the calculation. To be specific, it compares target evaporator outlet temperature corresponding to the target suction pressure with the actual evaporator outlet temperature sensed by the evaporator temperature sensor 25, to thereby control the capacity of the compressor 7.

As regards the cooling-down control mode, the arithmetic control section 501 determines fulfillment of a predetermined condition for starting the cooling-down control. The predetermined condition for starting the cooling-down control in this embodiment is that the air conditioner has been turned on from an off state, and then the evaporator outlet temperature is equal to or higher than the fresh air temperature. When the predetermined condition is fulfilled, the compressor 7 is operated at the maximum capacity for a limited period of time. A control program for executing this cooling-down control is stored in a program storage section (ROM) of the microcomputer, for determining whether the predetermined condition is satisfied, from the outputs from the evaporator temperature sensor 25, the fresh air temperature sensor 22, etc., starting the aforesaid timer under a prescribed condition when the cooling-down control has been initiated, and monitoring the counting time of the timer to hold the capacity of the compressor at the maximum value over the limited period of time.

Figure 7:
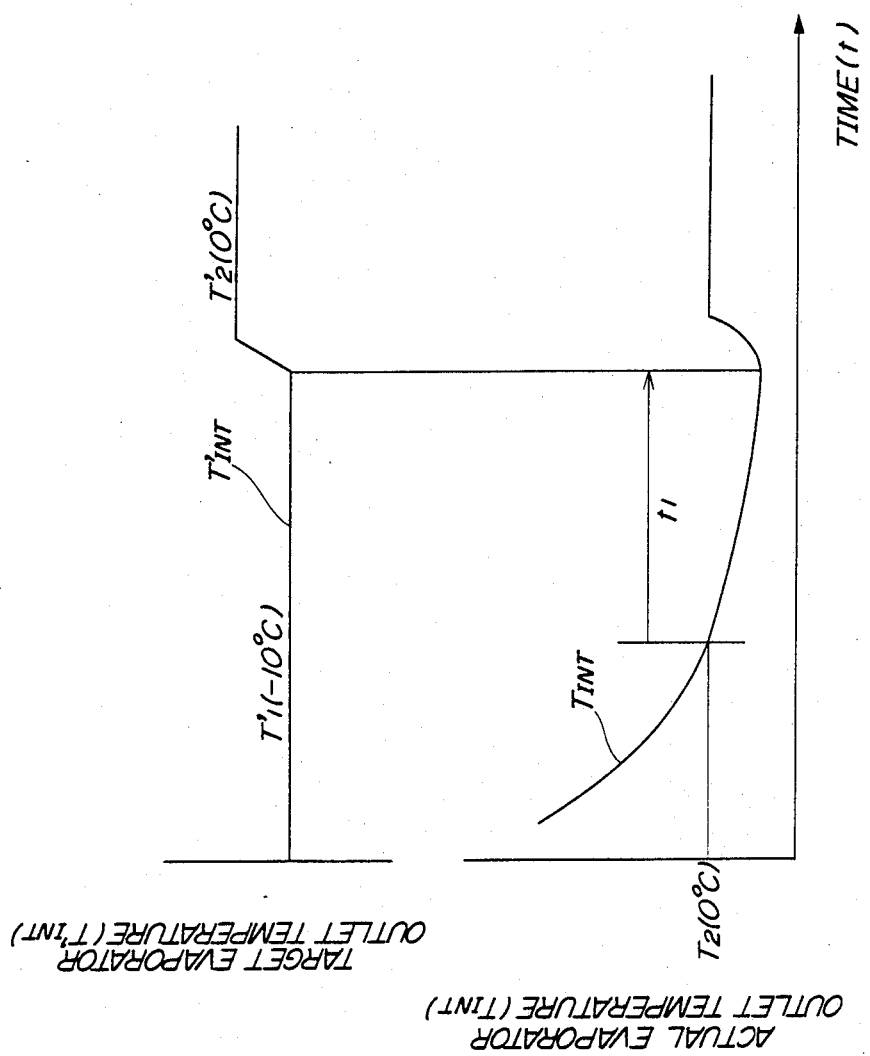
FIG. 7 is a graph showing changes in the target value and actual value of the temperature at the outlet of the evaporator, plotted with respect to the lapse of time, according to the control by the arrangement of FIG. 6.

The operation of the embodiment will now be described with reference to FIG. 7.

Let it now be assumed that the air conditioner (A/C) is in on state, and the driver or passenger has selected ordinary control mode (automatic control mode), manually, i.e. by pushing the automatic switch 44. Then, the target discharge air temperature is calculated from the compartment temperature from the recirculated air temperature sensor 21, the fresh air temperature from the fresh air temperature sensor 22, the sunshine intensity from the pyrheolimeter 23, and the set compartment temperature from the compartment temperature-setting switch 52. The target suction pressure for opening the valve body 213, i.e. the target evaporator outlet temperature is set, which corresponds to the calculated target discharge air temperature. The value of current supplied to the solenoid 214 of the electromagnetic actuator 211 is controlled so that the actual evaporator outlet temperatuer from the evaporator temperature sensor 25 becomes equal to the set target evaporator outlet temperature, whereby the capacity of the compressor 7 is controlled to vary.

On the other hand, the cooling-down control is started when the air conditioner (A/C) has been turned on, and then the actual evaporator outlet temperature $T_{INT}$ is equal to or higher than the fresh air temperature $T_{AN}$. To be specific, when this condition has been fulfilled, the control unit 20 sets the target suction pressure, i.e. the target the evaporator outlet temperature $T'_{INT}$ to a predetermined value $T'_1$ (e.g. $-10°$ C.) lower than the freezing point of the evaporator, for example, as shown in FIG. 7, and then controls the current value supplied to the solenoid 214 in FIG. 3 so as to make the compressor capacity the maximum. After the compressor 7 has thus been set to the maximum capacity, when the actual evaporator outlet temperature $T_{INT}$ reaches a predetermined value $T_2$ (e.g. 0° C.), the aforesaid timer is started to count the predetermined period of time $t_1$.

During the predetermined period of time $t_1$, the compressor 7 is operated at the maximum capacity to effect high rate cooling. When the predetermined period of time $t_1$ elapses, the target evaporator outlet temperature $T'_{INT}$ is gradually varied to a predetermined value $T'_2$ (e.g. 0° C.) with a predetermined gradient as shown in FIG. 7, followed by effecting control in ordinary control mode.

By thus providing the cooling-down control mode in addition to the ordinary control mode, the compressor 7 is positively operated with the maximum capacity over a limited period of time after the compressor 7 has been turned on, specifically after the evaporator outlet temperature $T_{INT}$ has reached the predetrmined value $T_2$ and until the predetermined fixed period of time $t_1$ elapses thereafter, thereby enabling to secure a sufficient degree of cooling-down ability without a drop in the compressor capacity as distinct from the conventional air conditioning control systems.

The cooling-down control initiating condition of evaporator outlet temperature $T_{INT} \geq$ fresh air temperature $T_{AN}$ is effective to obtain a relatively long period of time for which the cooling-down control is effected, whereby cooling-down can be carried out at a high rate for a long period of time while preventing freeze-up of the evaporator.

Alternatively, the cooling-down control initiating condition may be that the air conditioner (A/C) has been turned on from an off state, and then a synthetic signal indicative of total thermal load on the air conditioner, determined from the outputs from the recirculated air temperature sensor 21, etc. assumes a value higher than a predetermined value of thermal load.

Figure 8:
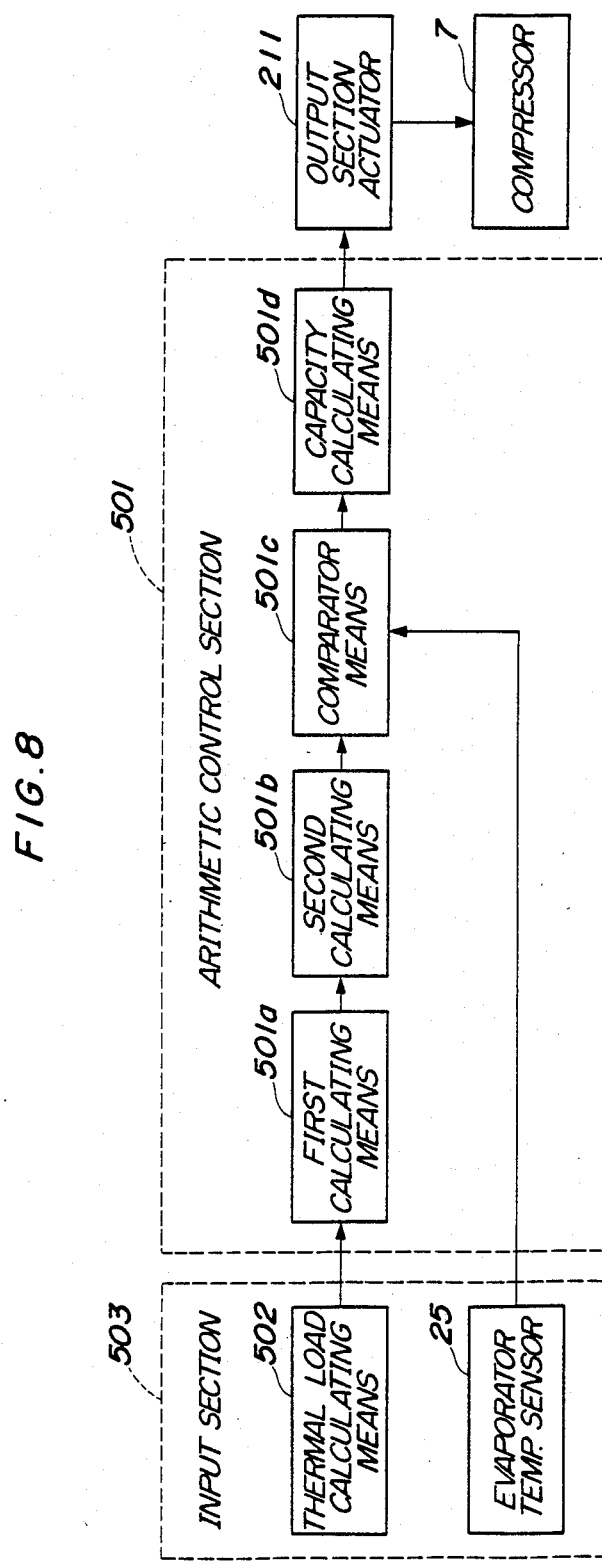
FIG. 8 is a block diagram showing an arrangement for carrying out compressor capacity control in cooling-down mode by means of a timer and target discharge air temperature.

FIG. 8 shows a block diagram of an arrangement for carrying out compressor capacity control according to another embodiment of the invention.

In this embodiment, the arithmetic control section 501 has first caleulating means 501a for calculating the target discharge air temperature from a synthetic signal calculated from compartment temperature, fresh air temperature and set compartment temperature from the thermal load calculating means 502, second caleulating means 501b for calculating the target evaporator cooling degree or target evaporator outlet temperature from the output from the first caleulating means 501a, comparator means 501c for comparing between the results of calculation from the second caleulating means 501b and the output from the evaporator temperature sensor 25, and capacity calculating means 501d for calculating the value of an external control signal from the output from the comparator means 501d so that the difference between the target evaporator outlet temperature and the actual one is held below a predetermined value and supplying the same signal to the compressor 7. According to this embodiment, during cooling-down control, the capacity of the compressor 7 is held at the maximum value, either until a predetermined period of time elapses as in the previous embodiment, or until the required or target discharge air temperature reaches a predetermined value.

The cooling-down control initiating condition in this embodiment is that the target discharge air temperature is below a first predetermined value $X_1$.

To this end, also in this embodiment, a timer for counting the predetermined period of time is used as in the previous embodiment. A control program is stored in the program storage section of the control unit or microcomputer 20, which controls the capacity of the compressor 7 such that when the above-mentioned initiating condition is fulfilled, the capacity is held at the maximum value, either until the target discharge air temperature reaches a second predetermined value $X_2$ higher than the first predetermined value $X_1$, or until the predetermined period of time elapses, which is started to be counted after the compressor 7 is turned on from an off state. The microcomputer monitors the counting of the timer and also monitors the target discharge air temperature calculated by the first caleulating means 501a, and carries out the above program depending upon the results of monitoring.

This embodiment will be described more in detail with reference to FIG. 9.

Figure 9:
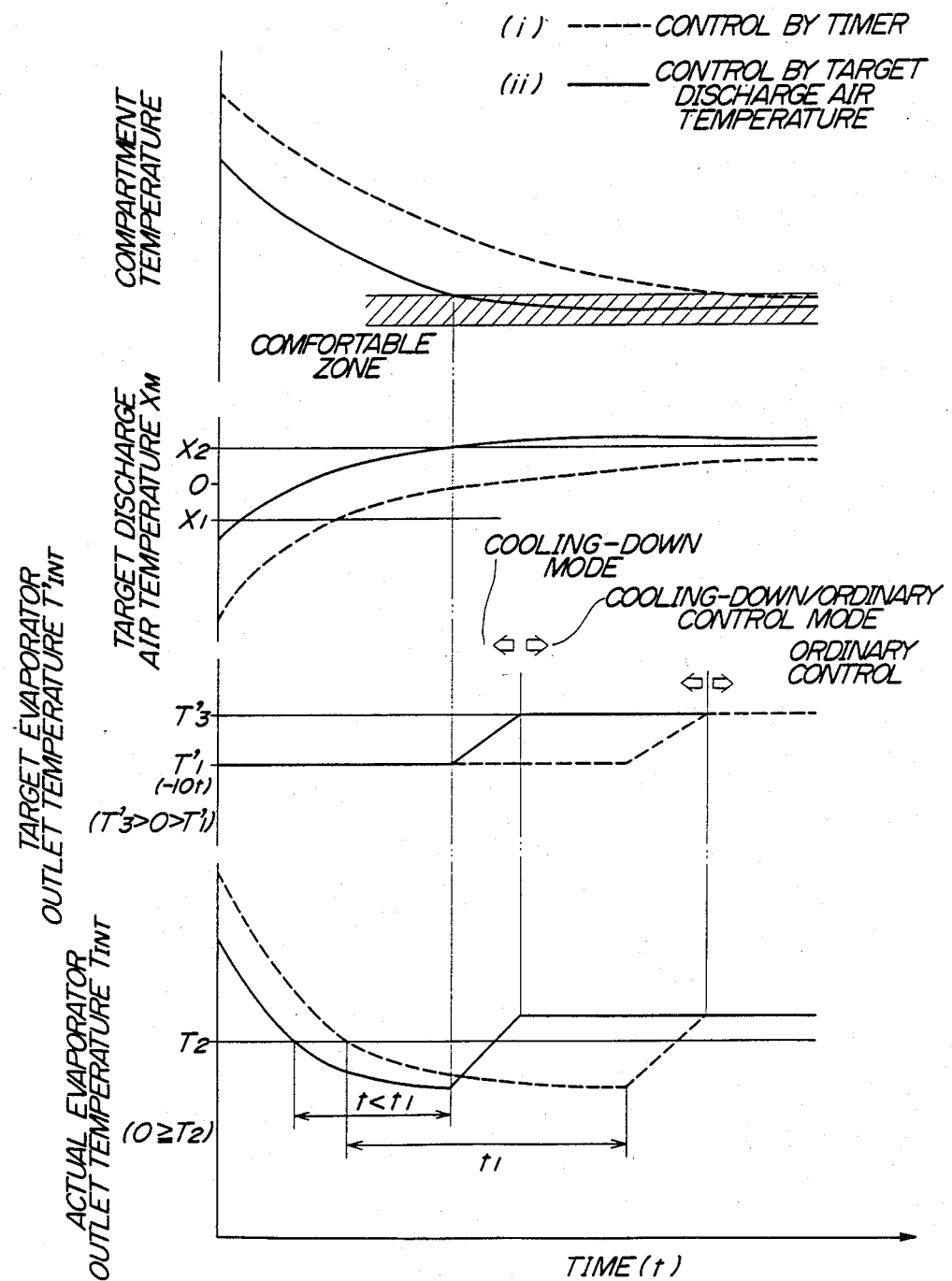
FIG. 9 is a graph showing changes in the compartment temperature, the target discharge air temperature, and the target value and actual value of the evaporator outlet temperature, plotted with respect to the lapse of time, according to the control by the arrangement of FIG. 8.

In FIG. 9, which shows changes in the compartment temperature, the target discharge air temperature $X_M$, the target evaporator outlet temperature $T'_{INT}$, and the actual evaporator outlet temperature (evaporator temperature) $T_{INT}$, the broken lines show changes in these temperatures occurring during trasition from the cooling-down control to the ordinary control by the use of the timer, whereas the solid lines show such changes occurring during the transition by the use of the target discharge air temperature $X_M$.

First, when the compressor has been turned on from an off state, the below-described control (i) or (ii) is carried out, provided that the following condition is fulfilled:

$$X_M \leq X_1 \quad \quad \quad \quad \ldots (1)$$

where $X_1$ is the first predetermined value referred to above, which is set at a value of 0° C. or below. In the example of FIG. 9, it is set at a value below 0 ° C.

If the above cooling-down control initiating condition is fulfilled, the control (i) is executed when the compartment temperature is relatively high, the target discharge air temperature $X_M$ (calculated by the first caleulating means 501a) is relatively low, and the actual evaporator outlet temperature $T_{INT}$ is relatively high, while the control (ii) is executed when just a reverse condition to the above is fulfilled, that is, when the compartment temperature is relatively low, the target discharge air temperature $X_M$ is relatively high, and the actual evaporator temperature $T_{INT}$ is relatively low.

First, the control (i) is to effect the cooling-down control so as to shift to the ordinary control, by the use of the timer. As shown in FIG. 9, when the cooling-down control initiating condition is fulfilled, the target discharge air temperature $T'_{INT}$ set to the predetermined value $T'_1$ ($<0°$ C., e.g. $-10°$ C.). That is, the suction pressure of the compressor 7 is lowered below the freezing point of the evaporator. As the compressor 7 is thus operated at the maximum capacity, the temperature of the evaporator 5 lowers, that is, the evaporator outlet temperature $T_{INT}$ lowers as indicated by the broken line. Also, the compartment temperature lowers accordingly as indicated by the broken line, and with decrease of the compartment temperature the target discharge air temperature $X_M$ calculated by the first caleulating means 501a varies toward a higher value as indicated by the broken line.

In the meanwhile, the control unit 20 monitors the temperature of the outlet of the evaporator 5 through the evaporator temperature sensor 25. When the actual evaporator outlet temperature $T_{INT}$ drops and reaches the predetermined value $T_2$ ($\leq °$C., e.g. 0 ° C.), the timer is started to count the predetermined fixed period of time $t_1$.

When the timer has counted up the predetermined period of time $t_1$, the target evaporator outlet temperature $T'_{INT}$ is varied with a predetermined gradient to a higher third predetermined value $T'_3$ ($>0$), which is a target value for the ordinary control, and thereafter the ordinary control is effected to control the evaporator temperature to the third predetermined value $T'_3$.

As will be learned from the above described cooling down manner, according to the control (i), the compartment temperature is relatively slowly lowered to the comfortable zone.

In contrast, the control (ii) is to effect cooling-down control so as to shift to the ordinary control, by the use of the target discharge air temperature $X_M$. According to this control, although the timer is started as in the control (i), the compartment temperature should reach the comfortable zone relatively soon, before the predetermined period of time $t_1$ is counted up. Therefore, the cooling-down control is terminated earlier than in the control (i), followed by initiating the ordinary control.

More specifically, when the aforesaid cooling-down control initiating condition is fulfilled, like the control (i) the target evaporator outlet temperature $T'_{INT}$ is set to the predetermined value $T'_1$ as shown by the solid line in FIG. 9. Also during the control (ii), the actual evaporator outlet temperature $T_{INT}$ and the target discharge air temperature $X_M$ vary along similar curves to those in the control (i). However, in this control (ii) the compartment temperature and the evaporator outlet temperature $T_{INT}$, as indicated by the solid lines, are lower than the respective ones indicated by the broken lines, and the target discharge air temperature, as indicated by the solid line, is lower than one indicated by the broken line, the time point at which the temperature $T_{INT}$ reaches the predetermined value $T_2$ and at which the timer is started is earlier than that in the control (i), and hence the compartment temperature lowers to the comfortable zone sooner than in the control (i).

After the timer started counting the predetermined period of time $t_1$ at the time point of $T_{INT}=T_2$, if the target discharge air temperature $X_M$ reaches the second predetermined value $X_2$ (e.g. 8° C.) before the timer counts up, i.e. when $t<t_1$, the second predetermined value $X_2$ being such a value as is reached when the compartment temperature lowers to the comfortable zone, then the target evaporator outlet temperature $T'_{INT}$ is increased with a predetermined gradient to the target value $T'_3$ for the ordinary control, as indicated by the solid line, and thereafter similarly to the control (i) the ordinary control is effected. Thus, according to the control (ii), the compartment temperature is lowered to the comfortable zone sooner as compared with the control (i), and thereafter the compartment temperature is controlled in the ordinary control mode.

As described above, according to the second embodiment, either the control (i) or the control (ii) is selected depending upon the initial values of the temperatures such as compartment temperature, and the selected control is effected by means of the timer or the target discharge air temperature to carry out cooling-down control and shift the control mode to the ordinary control. Both the control (i) and the control (ii) operate the compressor 7 at the maximum capacity over a certain period of time to enhance the cooling-down ability. Particularly according to the control (ii), if the compartment temperature is quickly lowered to the comfortable zone before the timer counts up, the maximum capacity operation of the compressor can be terminated at an early time, thereby enabling to save fuel consumption of the engine.

What is claimed is:

1. In an air conditioning control system for an automotive vehicle, which comprises a compressor controllable in capacity in response to an external control signal, an evaporator connected to said compressor, sensor means for sensing a temperature of said evaporator, arithmetic control means for calculating a value of said control signal based upon an output from said sensor means, and output means for supplying said control signal having a value calculated by said arithmetic control means carrying out first mode control in which it calculates the value of said control signal so that the temperature of said evaporator is held at a predetermined value, the improvement wherein said arithmetic control means carries out, in addition to said first mode control, second mode control in which, if a predetermined condition is satisfied, it calculates the value of said control signal so that the capacity of said compressor is brought to the maximum value, for a limited period of time after said compressor is started;

wherein said arithmetic control means carries out said second mode control in a manner such that (a) when said compressor has been turned on from an off state, a target value of the temperature of said evaporator is set to a first predetermined value lower than a freezing point of said evaporator to operate said compressor at the maximum capacity, (b) said compressor is continually operated at the maximum capacity for a predetermined fixed period of time after a value of the temperature of said evaporator sensed by said sensor means reaches a second predetermined value higher than said first predetermined value, and (c) when said predetermined fixed period of time elapses, shifting from said second mode control to said first mode control.

2. An air conditioning control system as claimed in claim 1, including second sensor means for sensing fresh air temperature, and wherein said predetermined condition is fulfilled when the sensed value of the temperature of said evaporator is equal to or higher than a value of the fresh air temperature sensed by said second sensor means.

3. An air conditioning control system as claimed in claim 1, including thermal load calculating means for calculating thermal load on the air conditioning control system, and wherein said predetermined condition is fulfilled when the thermal load calculated by the thermal load calculating means is larger than a predetermined value.

4. An air conditioning control system as claimed in claim 1, including thermal load calculating means for calculating thermal load on the air conditioning control system, and wherein said arithmetic control means calculates a target value of discharge air temperature from the thermal load calculated by the thermal load calculating means is equal to or lower than a predetermined value said predetermined condition being fulfilled when the calculated target value of discharge air temperature is equal to or lower than a predetermined value.

5. In an air conditioning control system for an automotive vehicle, which comprises a compressor controllable in capacity in response to an external control signal, an evaporator connected to said compressor, sensor means for sensing a temperature of said evaporator, arithmetic control means for calculating a value of said control signal based upon an output from said sensor means, and output means for supplying said control signal having a value calculated by said arithmetic control means carrying out first mode control in which it calculates the value of said control signal so that the temperature of said evaporator is held at a predetermined value, the improvement wherein said arithmetic control means carries out, in addition to said first mode control, second mode control in which, if a predetermined condition is satisfied, it calculates the value of said control signal so that the capacity of said compressor is brought to the maximum value, for a limited period of time after said compressor is started;

thermal load calculating means for calculating thermal load on the air conditioning control system; and wherein said arithmetic control means calculates a target value of discharge air temperature such that the calculated target value increases as the thermal load calculated by the thermal load circulating means is smaller, said arithmetic control means carrying out said second mode control in a manner such that (a) when said compressor has been turned on from an off state, a target value of the temperature of said evaporator is set to a first predetermined value lower than a freezing point of said evaporator to operate said compressor at the maximum capacity, (b) said compressor is continually operated at the maximum capacity after a value of the temperature of said evaporator sensed by said sensor means reaches a second predetermined value higher than said first predetermined value, and (c) shifting from said second mode control to said first mode control when the calculated target value of the discharge air temperature increases to a first predetermined value as the calculated thermal load becomes smaller due to the operation of said compressor.

6. An air conditioning control system as claimed in claim 5, wherein said predetermined condition is fulfilled when the calculated value of the discharge air temperature is equal to or lower than a second predetermined value lower than said first predetermined value.

7. An air conditioning control system as claimed in claim 5, wherein said thermal load includes temperature within a compartment of said automotive vehicle.

8. An air conditioning control system as claimed in claim 7, wherein said first predetermined value is set at such a value as is reached when the temperature within the compartment of said automotive vehicle lowers to a comfortable zone.

9. An air conditioning control system as claimed in any one of claims 5–8, wherein said arithmetic control means starts, in said step (b), counting a predetermined fixed period of time when the sensed temperature of said evaporator reaches said second predetermined value, and shifts control mode from said second mode control to said first mode control at earlier one of the time when the target value of the discharge air temperature reaches said first predetermined value and the time when said predetermined fixed period of time elapses.

10. An air conditioning control system as claimed in any one of claims 2–8, wherein said evaporator has an outlet connected to a suction side of said compressor, the temperature of said evaporator being the temperature of said outlet of said evaporator.

* * * * *

UNITED STATES PATENT AND TRADEMARK OFFICE
CERTIFICATE OF CORRECTION

PATENT NO. : 4,909,043
DATED : March 20, 1990
INVENTOR(S) : MASAUJI et al

It is certified that error appears in the above-identified patent and that said Letters Patent is hereby corrected as shown below:

Column 12, line 27 (Claim 10):

Change "of claims 2-8" to --of claims 1 and 2-8--.

Signed and Sealed this

Twenty-fifth Day of May, 1993

Attest:

MICHAEL K. KIRK

*Attesting Officer*  Acting Commissioner of Patents and Trademarks